(12) United States Patent
Ranger et al.

(10) Patent No.: US 11,599,418 B2
(45) Date of Patent: Mar. 7, 2023

(54) MAINTAINING COMPONENTS OF NETWORKED NODES WITH DISTRIBUTED DATA DEPENDENCIES

(71) Applicant: EMC IP Holding Company LLC, Hopkinton, MA (US)

(72) Inventors: Mark Ranger, Seattle, WA (US); Michael Frank, Seattle, WA (US); David T Leimbach, Lynnwood, WA (US); Raymond Ramsden, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 210 days.

(21) Appl. No.: 16/878,062

(22) Filed: May 19, 2020

(65) Prior Publication Data

US 2021/0365317 A1  Nov. 25, 2021

(51) Int. Cl.
*G06F 12/00* (2006.01)
*G06F 13/00* (2006.01)
*G06F 13/28* (2006.01)
*G06F 11/10* (2006.01)
*G06F 11/14* (2006.01)
*G06F 16/27* (2019.01)
*G06F 3/06* (2006.01)

(52) U.S. Cl.
CPC ........ *G06F 11/1076* (2013.01); *G06F 3/0619* (2013.01); *G06F 3/0689* (2013.01); *G06F 11/1425* (2013.01); *G06F 16/27* (2019.01)

(58) Field of Classification Search
CPC .... G06F 11/1076; G06F 3/0689; G06F 3/067; G06F 3/0619; G06F 3/065

USPC ......................................................... 711/114
See application file for complete search history.

(56) References Cited

U.S. PATENT DOCUMENTS

| | | | |
|---|---|---|---|
| 11,216,340 B2* | 1/2022 | Ma | G06F 3/0659 |
| 11,296,998 B2* | 4/2022 | Jensen-Horne | G06F 9/5061 |
| 2004/0210582 A1* | 10/2004 | Chatterjee | G06F 16/27 707/999.009 |
| 2015/0286531 A1* | 10/2015 | Bondurant | G11B 5/012 714/6.23 |
| 2016/0170841 A1* | 6/2016 | Yarnell | G06F 11/1469 714/19 |
| 2020/0012488 A1* | 1/2020 | Koval | G06F 9/4401 |
| 2021/0234923 A1* | 7/2021 | Kumar | H04L 67/1012 |
| 2021/0365317 A1* | 11/2021 | Ranger | G06F 3/0617 |

* cited by examiner

*Primary Examiner* — Mohamed M Gebril
(74) *Attorney, Agent, or Firm* — Amin, Turocy & Watson, LLP

(57) ABSTRACT

Methods, systems and computer program products for maintaining components of networked nodes with distributed data dependencies are described. For example, in accordance with one or more embodiments, a method can comprise identifying, by a device comprising a processor, in a group of dependent nodes of a cluster of nodes, a first portion of the dependent nodes for which an update is implicated. The method can further comprise selecting, by the device, from the first portion, a second portion of the dependent nodes that are predicted to be able to be updated with the update without affecting access to data of the group of dependent nodes. Further, the method can comprise communicating, by the device, the update to the second portion of the dependent nodes.

20 Claims, 10 Drawing Sheets

700 ⇗

702 — IDENTIFYING, BY A DEVICE COMPRISING A PROCESSOR, IN A GROUP OF DEPENDENT NODES OF A CLUSTER OF NODES, A FIRST PORTION OF THE DEPENDENT NODES FOR WHICH AN UPDATE IS IMPLICATED

704 — SELECTING, BY THE DEVICE, FROM THE FIRST PORTION, A SECOND PORTION OF THE DEPENDENT NODES THAT ARE PREDICTED TO BE ABLE TO BE UPDATED WITH THE UPDATE WITHOUT AFFECTING ACCESS TO DATA OF THE GROUP OF DEPENDENT NODES

706 — COMMUNICATING, BY THE DEVICE, THE UPDATE TO THE SECOND PORTION OF THE DEPENDENT NODES

*FIG. 7*

MAINTAINING COMPONENTS OF NETWORKED NODES WITH DISTRIBUTED DATA DEPENDENCIES

TECHNICAL FIELD

The subject application generally relates to computer applications, and, for example, to maintaining network computing devices with shared data dependencies, and related embodiments.

BACKGROUND

As the use of large amounts of data by organizations increases, modern storage solutions can incorporate different approaches to scaling capacity. One approach to expansion uses distributed systems to horizontally scale capacity, e.g., add additional computing devices to a system to increase capacity, rather than upgrade the capabilities of existing systems. One of the benefits to using distributed systems is an increase in performance that can be realized based on concurrent operation of the systems, e.g., lower latency. Another benefit involves fault tolerance, e.g., individual systems can fail without affecting the entire system.

Like most computing systems, nodes of distributed systems can require periodic updates to continue operating securely, and at an acceptable level of performance. Problems can occur however, when nodes are disabled during updates. Conventional scheduling approaches however can rely on long maintenance windows of unavailability that can cause disruption for those requiring access to the distributed data stored in these systems.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components, a network interface that connects to a network of peer node devices, a drive storage device that stores node data in coordination with related data stored in a second node device selected from the peer node devices, the first node device and the second node device being in a defined neighborhood of node devices selected from the peer node devices, and a processor that executes the computer executable components stored in the memory. The computer executable components can include an update receiving component to receive an update for a component of the first node device based on a prediction by an updating device that the component of the first node device is able to be updated with the update without affecting access to the related data stored in the neighborhood of node devices. In one or more embodiments, an updating component to update the component of the first node device while the first node device is disabled from providing the node data.

One or more additional embodiments can provide a method that can facilitate managing the updating of local components based on data dependencies managed by an updating device, in accordance with one or more embodiments. The method can comprise storing, by a first node device, node data in coordination with related data stored in a second node device selected from peer node devices, the first node device and the second node device being in a defined neighborhood of node devices selected from the peer node devices. The method can further comprise receiving an update for a component of the first node device based on a prediction by an updating device that the component of the first node device is able to be updated with the update without affecting access to the related data stored in the neighborhood of node devices. The method can further comprise updating the component of the first node device while the node device is disabled from providing the node data.

Additional embodiments can comprise a machine-readable storage medium comprising executable instructions that, when executed by a processor of a computing device, facilitate performance of operations, the operations comprising identifying in a group of dependent nodes of a cluster of nodes, a second device to be updated with an update, wherein the group of dependent nodes stores data linked across the group of dependent nodes. The operations can further comprise selecting from the group of dependent nodes, a third device to provide data of the second device while the second device is updated with the update. Further, the operations can comprise updating the second device with the update.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which:

FIG. 7 illustrates an example flow diagram for a method that can facilitate maintaining components of networked nodes with distributed data dependencies, in accordance with one or more embodiments.

DETAILED DESCRIPTION

Various aspects described herein are generally directed towards maintaining components of networked nodes with distributed data dependencies, in accordance with one or more embodiments. As will be understood, the implementation(s) described herein are non-limiting examples, and variations to the technology can be implemented.

Reference throughout this specification to "one embodiment," "one or more embodiments," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein can employ hardware and/or software to solve problems that are highly technical in nature (e.g., rapid determination and dissemination of distributed system state information, as well as the synchronizing of processes), that are not abstract and cannot be performed as a set of mental acts by a human. For example, a human, or even a plurality of humans, cannot efficiently, accurately and effectively, collect, encode, and transfer state information for the nodes of a distributed system, with the same level of accuracy and/or efficiency as the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
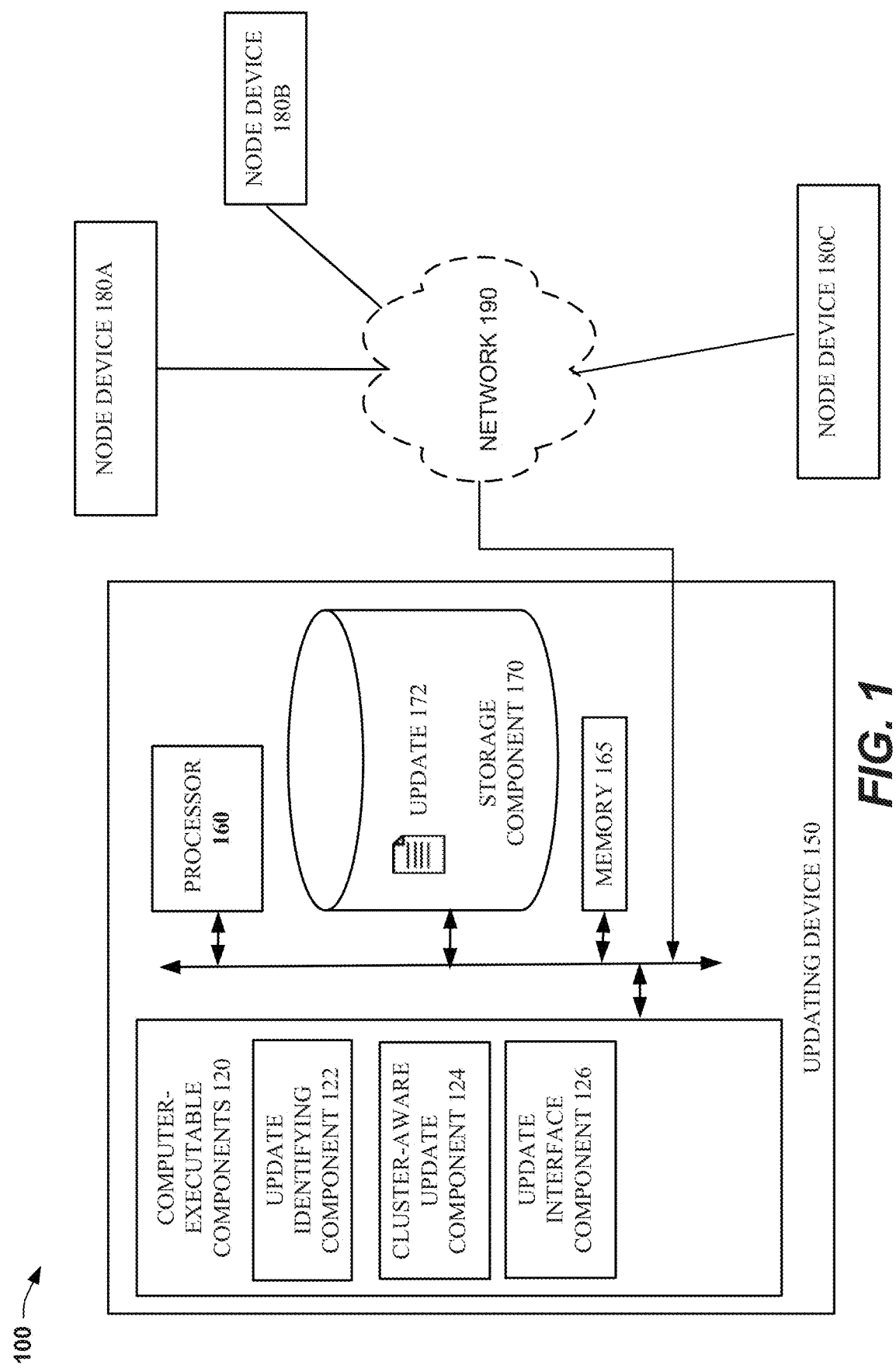
FIG. 1 illustrates a block diagram of an example, non-limiting system that can facilitate maintaining components of networked nodes with distributed data dependencies, in accordance with various aspects and implementations of the subject disclosure.

FIG. 1 illustrates a block diagram of an example, non-limiting system 100 that can facilitate maintaining components of networked nodes with distributed data dependencies, in accordance with various aspects and implementations of the subject disclosure. Repetitive description of like elements and/or processes employed in respective embodiments is omitted for sake of brevity.

System 100 can include maintenance device 185 communicatively coupled to node devices 180A-C via network 190. Maintenance device 185 can include computer-executable components 120, processor 160, storage component 170, memory 165, and communications interface 193. Examples of network 190 that can be used by one or more embodiments are discussed with FIGS. 9 and 10 below.

In one or more embodiments, system 100 can comprise memory 165 that can store computer executable components, and processor 160 that can execute the computer executable components stored in the memory. As discussed further below with FIG. 10, in some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like.

As described in some examples below, an example system that can benefit in some circumstances from the use of one or more embodiments, is a system that can facilitate sharing resources among networked computing devices, e.g., file storage systems and databases. In some implementations, system 100 can be a file storage system that implements a data protection system. In different implementations, data protection systems can benefit from the flexible expansion that one or more embodiments can facilitate, e.g., adding additional capacity with additional computing devices that can be included in the shared state described herein.

Example data protection systems which can employ one or more of the approaches described with embodiments herein include, but are not limited to EMC ISILON ONE FS®, an example network operating system for network attached storage (NAS) platforms provided by DELL EMC, Inc. Example storage array devices which can employ one or more of the approaches described with embodiments herein include, but are not limited to, POWERMAX enterprise data storage array system provided by DELL EMC, Inc.

Computer-executable components 120 can include update identifying component 122, cluster-aware update component 124, and other components described or suggested by one or more embodiments discussed herein. For example, in one or more embodiments, memory 165 can store computer-executable components 120 that, when executed by processor 160, can facilitate performance of operations described further herein.

In one or more embodiments, computer and/or computing-based elements 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining update identifying component 122. Example operations that update identifying component 122 that can facilitate for system 100 can include, identifying, by updating device 150, in a group of dependent nodes of a cluster of nodes, a first portion of the dependent nodes for which an update is implicated.

Continuing this example, in one or more embodiments, computer executable components 120 can include instructions that, when executed by processor 160, can facilitate performance of operations defining cluster-aware update component 124, in accordance with one or more embodiments. Example operations that cluster-aware update component 124 can perform include, but are not limited to, selecting, by updating device 150, from the first portion, a second portion of the dependent nodes that are predicted to be able to be updated with the update without affecting access to data of the group of dependent nodes. In one or more embodiments, groups can also be termed clusters, and cluster-aware update component can also be termed as being group-aware. Selecting the second portion of the dependent nodes can include selecting the second portion of the dependent nodes based on a journal shared between nodes of the second portion of the dependent nodes. Device 150 can have been selected based on a prediction that the device 150 would be able be updated without affecting access to the data linked across the group of dependent nodes.

In additional embodiments, computer executable components 120 can include instructions that, when executed by processor 160, can facilitate performance of operations defining update interface component 126. Example operations that update interface component 126 can perform include, but are not limited to, communicating, by the device, the update to the second portion of dependent node devices 180A-C.

Figure 2:
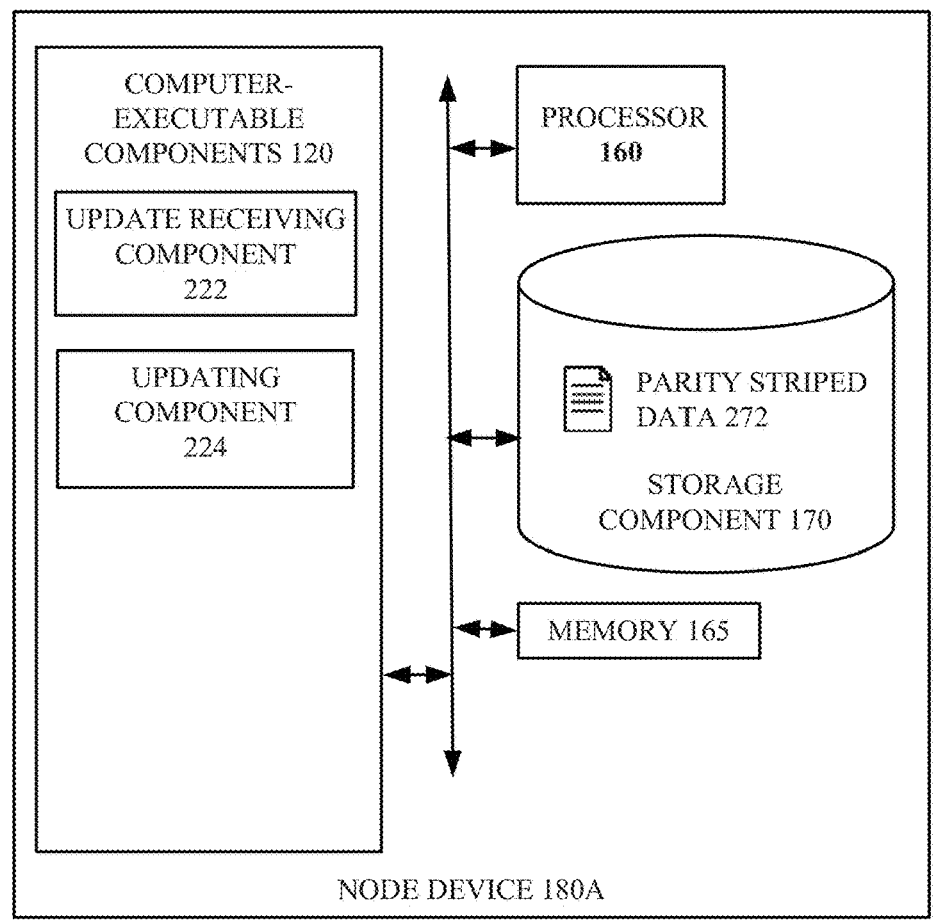
FIG. 2 illustrates a block diagram of a system that can facilitate managing the updating of local components based on data dependencies managed by an updating device, in accordance with one or more embodiments.

FIG. 2 illustrates a block diagram of a system 200 that can facilitate managing the updating of local components based on data dependencies managed by an updating device, in accordance with one or more embodiments. Repetitive description of like elements and/or processes employed in respective embodiments is omitted for sake of brevity.

System 200 can include node device 180A communicatively coupled, as depicted in FIG. 1, to node devices 180B-C and updating device 150 via network 190. Node device 180A can include computer-executable components 220, processor 160, storage component 170, memory 165, and other components System 100 can include maintenance device 185 communicatively coupled to nodes 180A-C via network 190. Maintenance device 185 can include computer-executable components 120, processor 160, storage component 170, memory 165, and communications interface 193. Examples of network 190 that can be used by one or more embodiments are discussed with FIGS. 9 and 10 below.

In one or more embodiments, system 100 can comprise memory 165 that can store computer executable components, and processor 160 that can execute the computer executable components stored in the memory. As discussed further below with FIG. 10, in some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like.

Computer-executable components 120 can include update identifying component 122, cluster-aware update component 124, and other components described or suggested by one or more embodiments discussed herein. For example, in one or more embodiments, memory 165 can store computer-executable components 220 that, when executed by processor 160, can facilitate performance of operations described further herein.

Figure 3:
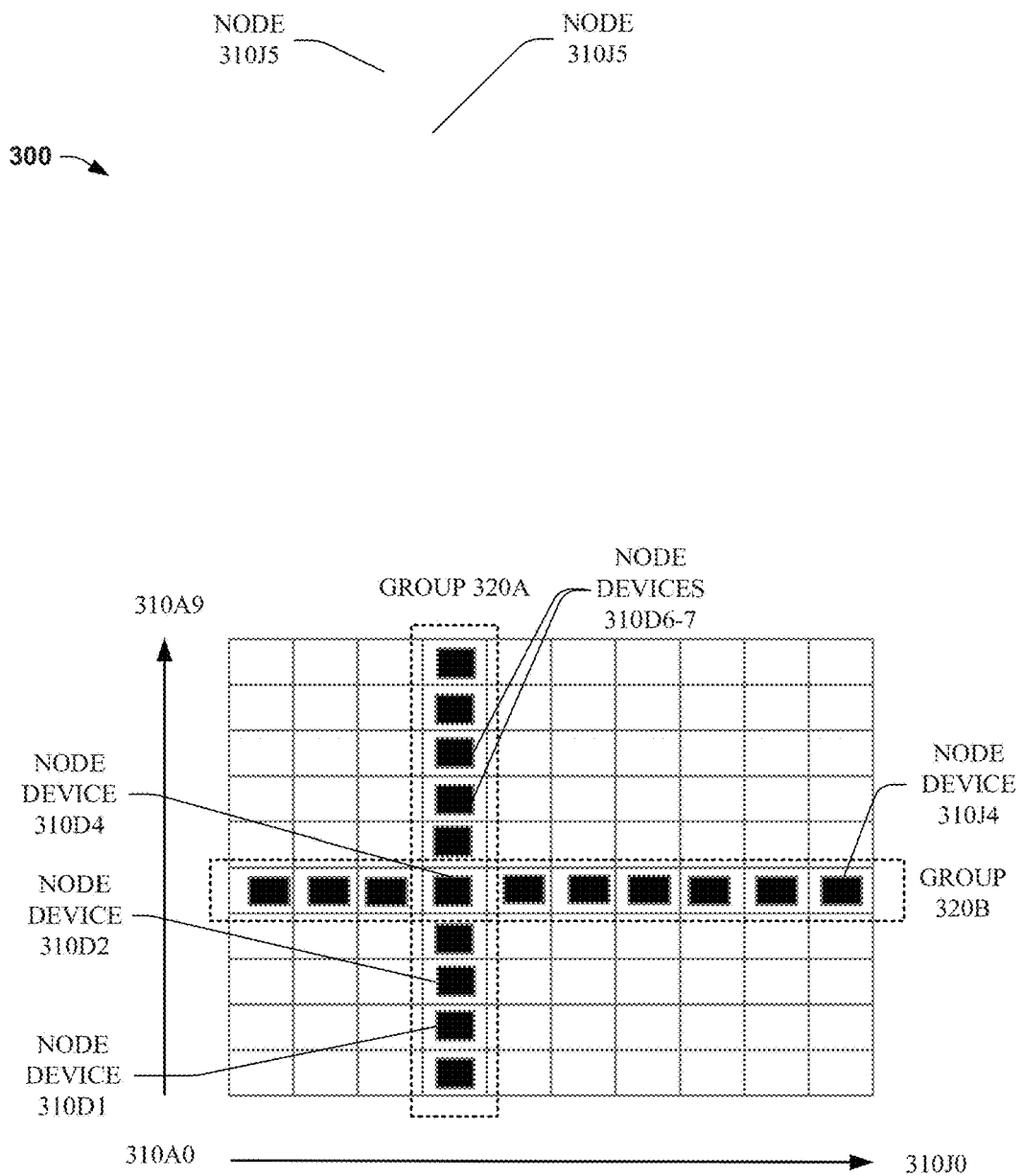
FIG. 3 depicts an example of networked nodes with distributed data dependencies based on groups of nodes, in accordance with one or more embodiments.

FIG. 3 depicts an example 300 of networked nodes with distributed data dependencies based on groups of nodes, in accordance with one or more embodiments. Repetitive description of like elements and/or processes employed in respective embodiments is omitted for sake of brevity.

Example 300 includes groups 320A-B of nodes, respectively including node devices 320D0-D0 and 320A4-J4, with node device 310D4 being in both groups 320A-B. As noted above, in exemplary embodiments, groups 320A-B of nodes (also termed herein as neighborhoods of nodes) include nodes that have distributed (e.g., across multiple nodes) data dependencies, e.g., nodes store data that, as stored, can depend upon data stored in other nodes. An example of data stored with distributed data dependencies include data stored with data protections that utilize redundant distributed storage structures, e.g., protected storage using parity protected stripes of data that span multiple nodes. It should be noted that, as with all examples described herein, this example is non-limiting, and other collections of networked nodes with distributed data dependencies can utilize may aspects of embodiments described herein.

Returning to the striped data across nodes example, different approaches can be used to implementing these redundant data structures, including approaches that can tolerate a disabling of one or more nodes of the dependent group of nodes, e.g., one benefit to these approaches is that nodes can be unavailable, from failure for example, and data can still be retrieved. In many circumstances however, certain combinations of grouped nodes cannot have certain functions simultaneously (e.g., concurrently) disabled, while a required likelihood of retrieving data is maintained.

Considering group 320A, in a simplistic example, while node device 310D1 can be disabled, with required data accessible, both node devices 310D1 and 310D4 cannot both be disabled with the example required data accessible. Based on different configuration options however, other combinations of nodes can retain required levels of data availability, e.g., in the current state, node devices 310D1, 310D2, and 310D6 can all be disabled (e.g., for updating components of respective nodes) while retaining data accessibility. As noted in the background section above, some approaches to updating nodes (e.g., components of nodes of group 320A) can miss available combinations of nodes, such as these example nodes, that can be updated simultaneously.

As noted above, in one or more embodiments, an update can be identified that can be applied to at least one node device of groups 320A-B. Based on the identified update, update identifying component 122 that can facilitate for system 100 can include, identifying, by updating device 150, in a group of dependent nodes of a cluster of nodes, a first portion of the dependent nodes for which an update was implicated.

Continuing this example, in one or more embodiments, computer executable components 120 can include instructions that, when executed by processor 160, can facilitate performance of operations defining cluster-aware update component 124, in accordance with one or more embodiments. Example operations that cluster-aware update component 124 can perform include, but are not limited to, selecting, by updating device 150, from the first portion, a second portion of the dependent nodes that are predicted to be able to be updated with the update without affecting access to data of the group of dependent nodes.

In additional embodiments, computer executable components 120 can include instructions that, when executed by processor 160, can facilitate performance of operations defining update interface component 126. Example operations that update interface component 126 can perform include, but are not limited to, communicating, by the device, the update to the second portion of dependent node devices 180A-C. In the example depicted in FIG. 3, an update can be identified that applies to one or more node devices 310D0-D9. In the example depicted in FIG. 4, the portion of nodes 310D0-D9 can be identified by one or more embodiments for additional operations by cluster-aware update component 124 and update interface component 126.

Figure 4:
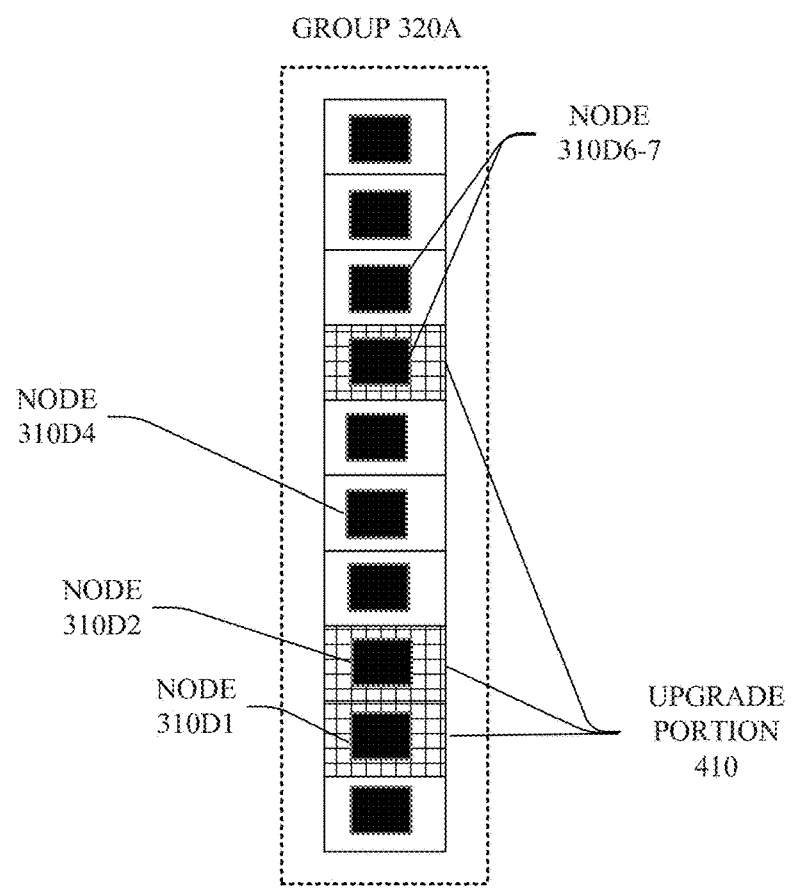
FIG. 4 depicts a subset of nodes depicted in FIG. 3, e.g., those in a group of node devices, in accordance with one or more embodiments.

FIG. 4 depicts a subset 400 of nodes depicted in FIG. 3, e.g., those in group 320A of node devices, in accordance with one or more embodiments. Repetitive description of like elements and/or processes employed in respective embodiments is omitted for sake of brevity.

As noted above, group 320A includes nodes 310D0-D9, and one or all of the nodes can implicate an update to a component of the node, e.g., software or hardware updates used to maintain security, performance, and other functions of node operating systems. In this example, to update a node with an identified update, the data-providing functions of the node are temporarily suspended.

To address the specifics of this example, and provide, in some circumstances, an approach that can advantageously maintain a sufficient level of access to data of group 320A, while expediting upgrade of necessary nodes, one or more embodiments can employ cluster-aware update component 124 of updating device 150, in accordance with one or more embodiments. For example, cluster-aware update component 124 identify the nodes of group 320A that require the identified update (also termed a first portion of all the nodes depicted FIG. 3), and, based on available data, select a portion of this first portion (also termed a second portion herein) that are predicted to be able to be updated with the update without affecting access to data of the group of dependent nodes.

It should be noted that, during the update process of the second portion of nodes, it is not required that all of the second portion of the nodes be rendered unavailable, and different approaches can attempt to maintain some of the nodes in an available state. It is one of the advantageous approaches that can be used by one or more embodiments described herein, that the updates to the second portion of nodes can proceed at a pace that could cause all of the second portion of nodes to be unavailable, but even in this event, a sufficient level of access to the data of group 320A would be maintained.

Thus, as depicted in FIG. 4, the entire group 320A of nodes 310D0-D9 are included in the first portion of nodes requiring the update (or, reflecting a level of need below 'requiring,' a group of nodes for which an update is implicated), and the second, upgrade portion 410 is identified as nodes 310D1, 310D2, and 310D6, e.g., a sufficient level of access to the dependent data stored in the nodes of group 320A is predicted to be able to be maintained during the estimated time period required to upgrade the components of nodes 310D1, 310D2, and 310D6.

Returning to the discussion of sufficient levels of access and nodes of the second portion being rendered unavailable, an example sufficient level of access can be defined as, given all of the nodes of the second portion being unavailable, there is no loss of data group 320A, and any unavailability of data is minimized, e.g., a cluster reconfiguration (e.g., using parity stripes) could fully restore all client access to the data of group 320A, without resort to other, hardware replacements of the data. Access to data of a group of dependent nodes can be enabled by replacing other data of the dependent nodes with error-correction data. Before replacing the other data, the error-correction data can be analyzed to predict whether the error-correction data will be able to replace the other data. One having skill in the relevant art(s), given the description herein, would appreciate that different levels of sufficient access to data can be used, depending upon implementation specific requirements, to guide the operation of embodiments, e.g., increases in updating performance can lead to increases in data retrieval overhead for the data of group 320A.

Having identified this upgrade portion 410, one or more embodiments of update device 150 can utilize update interface component 126 to facilitate communicating, by updating device 150, the update to the second portion of dependent node devices identified, e.g., nodes 310D1, 310D2, and 310D6, labeled as the upgrade portion of group 320A.

Figure 5:
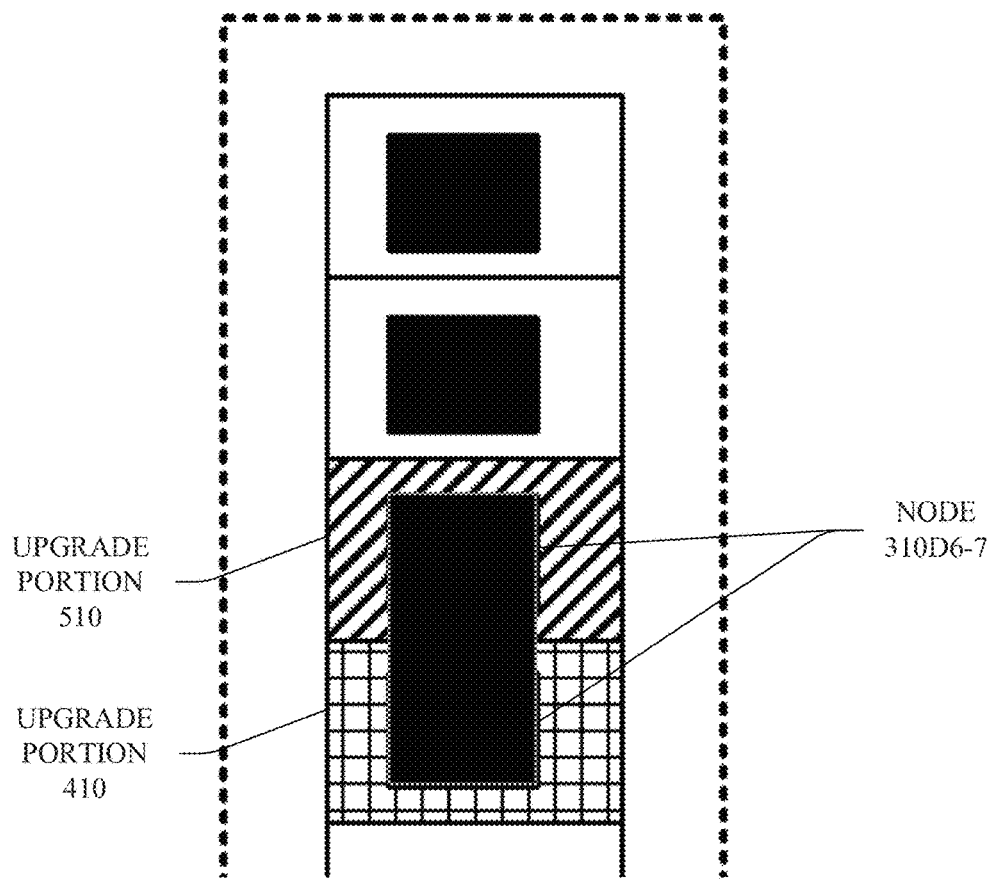
FIG. 5 illustrates a variation of embodiments described above that includes additional levels of dependency between one or more nodes of a group of nodes, in accordance with one or more embodiments.

FIG. 5 illustrates a variation 500 of embodiments described above that includes additional levels of dependency between one or more nodes of group 320A, in accordance with one or more embodiments. For purposes of brevity, description of like elements and/or processes employed in other embodiments is omitted.

In variation 500, node device 310D6 (a part of the selected second portion of nodes that can be unavailable during the updating process) is depended upon node 310D7 for some aspects node operations. As would be appreciated by one having skill in the relevant art(s), given the description herein, in certain implementations of the types of node systems described herein, one or more nodes can be arranged to share resources (e.g., power supplies, or communications interfaces) such that if one node is rendered unavailable by an update, the other dependent nodes are also rendered unavailable.

Thus, in this example, even though node 310D7 is not included in upgrade portion 410 as a node that can have aspects safely rendered unavailable during updates, in embodiment variation 500, node 310D7 is included in the analysis of node 310D6, e.g., because these nodes have the potential of having data availability linked. Thus, in some circumstances, if the combination of nodes 310D1, 310D2, and 310D6, as well as 310D7 being inoperable would not result in a sufficient level of access to the at of group 320A, then node 310D6 would have to be removed from the upgrade portion, and node 310D7 would not be added to the upgrade portion 410. While this disaggregation of the second portion can, in some circumstances, result in a degradation of upgrade performance, by assessing these additional dependencies, one or more embodiments can improve the accuracy of predictions, and increase the potential for safely improving update performance in other circumstances.

Figure 6:
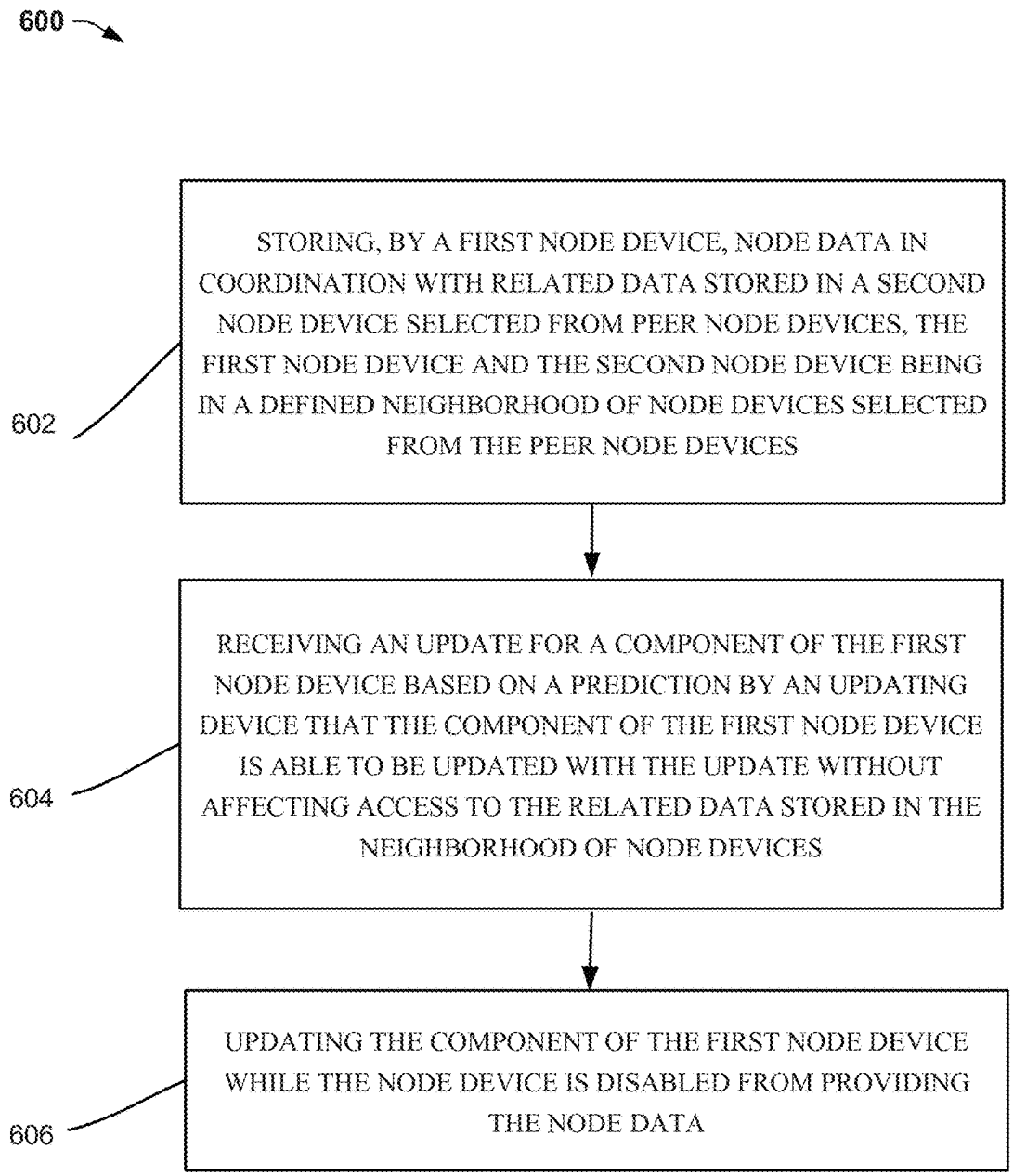
FIG. 6 illustrates an example flow diagram for a method that can facilitate managing the updating of local components based on data dependencies managed by an updating device, in accordance with one or more embodiments.

FIG. 6 illustrates an example flow diagram for a method 600 that can facilitate managing the updating of local components based on data dependencies managed by an updating device, in accordance with one or more embodiments. For purposes of brevity, description of like elements and/or processes employed in other embodiments is omitted. At element 602, method 600 can comprise storing, by a first node device, node data in coordination with related data stored in a second node device selected from peer node devices, the first node device and the second node device being in a defined neighborhood of node devices selected from the peer node devices.

At element 604, method 600 can further comprise receiving an update for a component of the first node device based on a prediction by an updating device that the component of the first node device is able to be updated with the update without affecting access to the related data stored in the neighborhood of node devices. At element 606, method 600 can further comprise updating the component of the first node device while the node device is disabled from providing the node data.

FIG. 7 illustrates an example flow diagram for a method 700 that can facilitate maintaining components of networked nodes with distributed data dependencies, in accordance with one or more embodiments. For purposes of brevity, description of like elements and/or processes employed in other embodiments is omitted. At element 702, method 700 can comprise identifying, by a device comprising a processor, in a group of dependent nodes of a cluster of nodes, a first portion of the dependent nodes for which an update is implicated.

At element 704, method 700 can comprise selecting, by the device, from the first portion, a second portion of the dependent nodes that are predicted to be able to be updated with the update without affecting access to data of the group of dependent nodes. At element 704, method 700 can comprise communicating, by the device, the update to the second portion of the dependent nodes.

Figure 8:
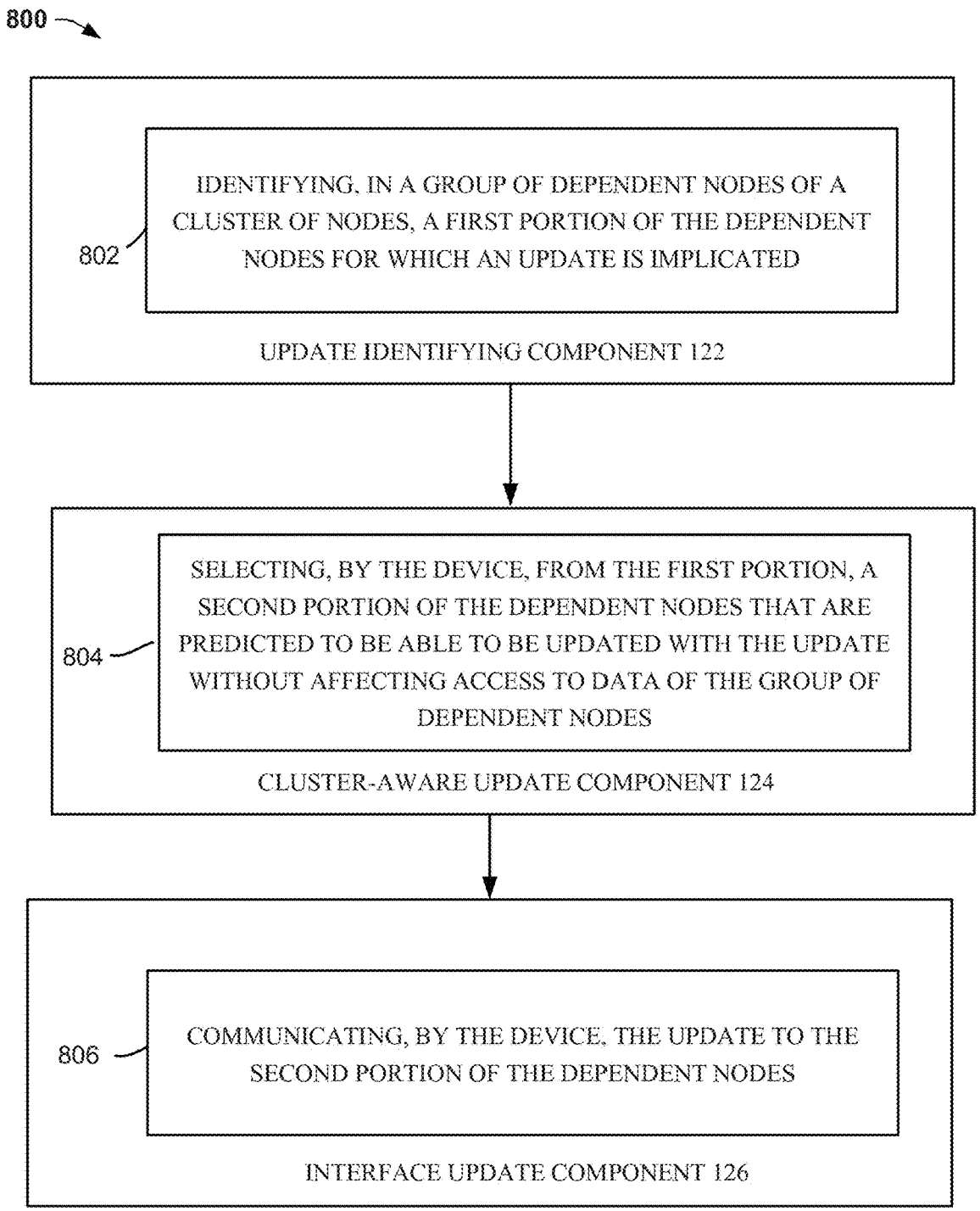
FIG. 8 is a flow diagram representing example operations of an example system comprising an update identifying component, a cluster-aware update component, and an interface update component, that can facilitate maintaining components of networked nodes with distributed data dependencies, in accordance with one or more embodiments.

FIG. 8 is a flow diagram representing example operations of an example system 800 comprising update identifying component 122, cluster-aware update component 124, and interface update component 126, that can facilitate maintaining components of networked nodes with distributed data dependencies, in accordance with one or more embodiments. For purposes of brevity, description of like elements and/or processes employed in other embodiments is omitted.

In one or more embodiments, update identifying component 122 can be configured 802 to identify, by a device comprising a processor, in a group of dependent nodes of a cluster of nodes, a first portion of the dependent nodes for which an update is implicated.

In one or more embodiments, cluster-aware update component 124 can be configured 804 to select, by the device, from the first portion, a second portion of the dependent nodes that are predicted to be able to be updated with the update without affecting access to data of the group of dependent nodes. In one or more embodiments, interface update component 126 can be configured 806 to communicate, by the device, the update to the second portion of the dependent nodes.

Figure 9:
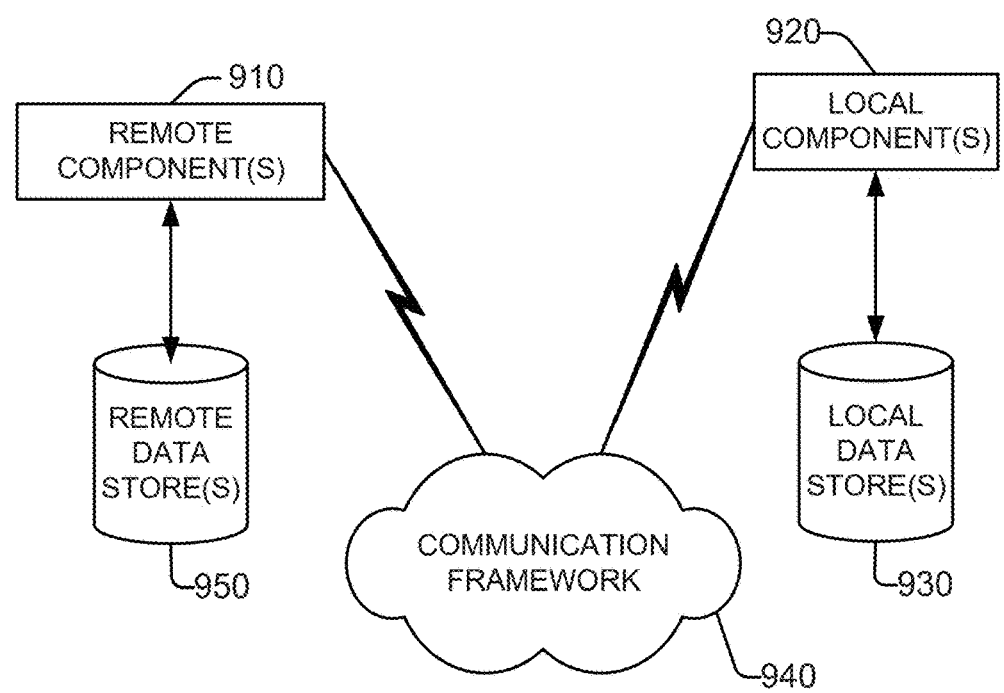
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
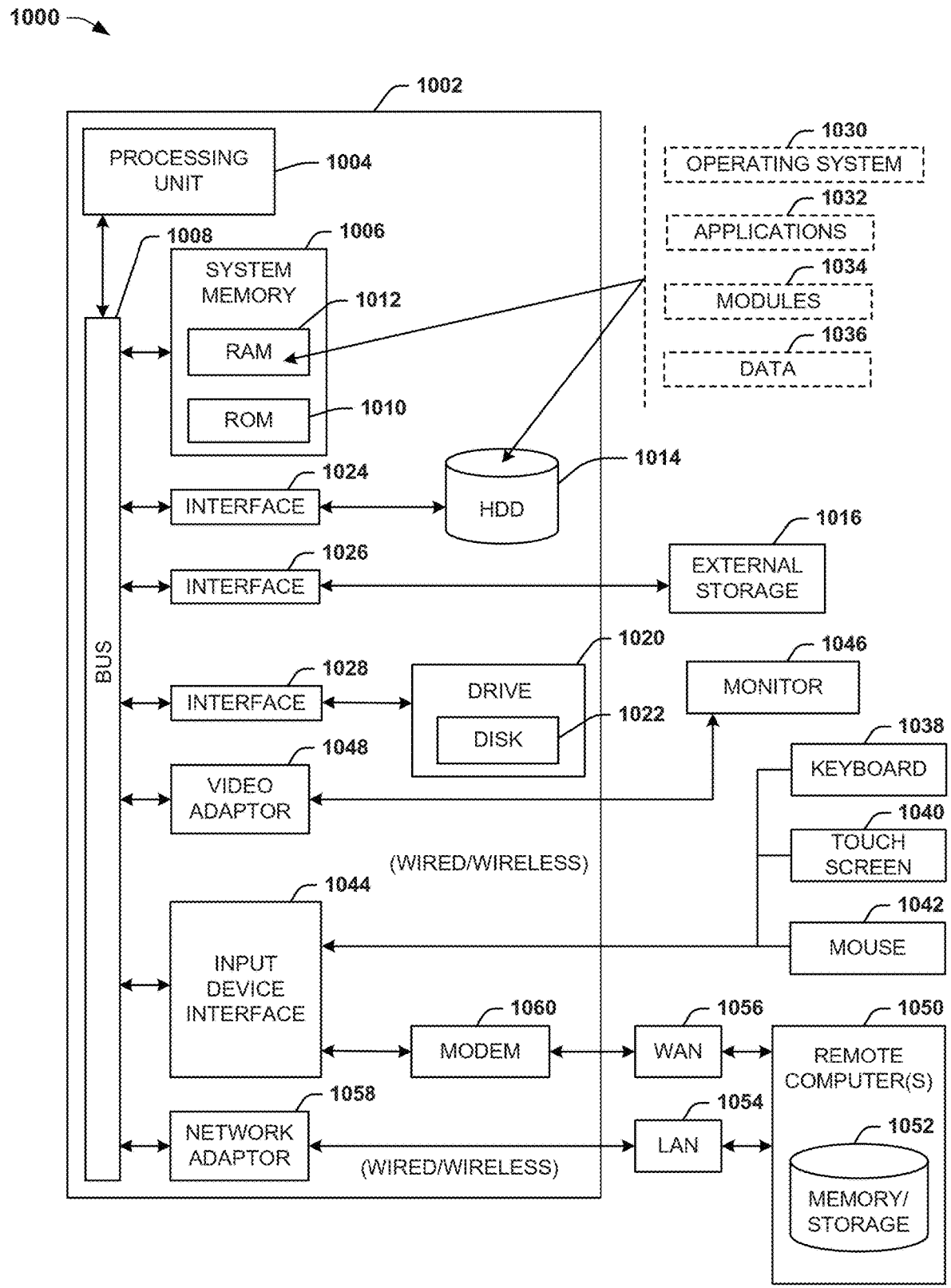
FIG. 10 illustrates an example block diagram of a computing system operable to execute the disclosed systems and methods in accordance with various aspects and implementations of the subject disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD), a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. A method, comprising:
   identifying, by a device comprising a processor, in a group of dependent nodes of a cluster of nodes, a first portion of the dependent nodes of the group, comprising first dependent nodes, for which an update is implicated, wherein the group of dependent nodes stores data linked across the group of dependent nodes;
   identifying, from the first portion, a second portion, comprising second dependent nodes, of the dependent nodes of the group, that have a dependency upon other nodes of the group other than the second dependent nodes, wherein, when the second dependent nodes of the second portion are rendered unavailable for providing access to the data by the update, the first dependent nodes of the first portion are not rendered unavailable for providing the access to the data;
   based on the first dependent nodes not being rendered unavailable for providing access to the data by the update, selecting, by the device, the second portion of the dependent nodes of the group to be updated with the update; and
   communicating, by the device, the update to the second portion of the dependent nodes of the group.

2. The method of claim 1, wherein the group of dependent nodes comprises a redundant array of an independent disks system.

3. The method of claim 2, wherein the data of the group of dependent nodes is first data, and wherein the redundant array of the independent disks system comprises second data corresponding to a parity protected stripe of data that spans the redundant array of the independent disks system.

4. The method of claim 1, wherein the selecting the second portion of the dependent nodes comprises selecting the second portion of the dependent nodes based on a journal shared between nodes of the second portion of the dependent nodes.

5. The method of claim 1, wherein the data of the group of dependent nodes is first data, and, wherein during the updating, the access to the first data of the group of dependent nodes is enabled by replacing second data of the second portion of the dependent nodes with error-correction data.

6. The method of claim 5, wherein the selecting the second portion of the dependent nodes comprises analyzing the error-correction data to predict whether the error-correction data is able to replace the second data of the second portion.

7. The method of claim 1, wherein the second portion of the dependent nodes is selected based on an estimated duration for the updating of the second portion of the dependent nodes with the update.

8. The method of claim 1, wherein the communicating the update to the second portion of the dependent nodes is for updating firmware of the second portion of the dependent nodes, and wherein the second portion of the dependent nodes is not accessible during the updating.

9. A first node device, comprising:
a memory that stores computer executable components;
a network interface that connects to a network of peer node devices;
a drive storage device that stores node data in coordination with related data stored in a second node device selected from the peer node devices, the first node device and the second node device being in a neighborhood of node devices selected from the peer node devices; and
a processor that executes the computer executable components stored in the memory, wherein the computer executable components comprise:
an update receiving component to receive an update for a component of the first node device, wherein the first node device was selected to receive the update based on the second node device being determined not to have a dependency on the first device, that results in, when the first device is rendered unavailable for provision of access to data by the update, the second device is not rendered unavailable for provision of the access to the data, and
an updating component to update the component of the first node device while the first node device is disabled from providing the node data.

10. The first node device of claim 9, wherein the neighborhood of node devices comprises a redundant array of independent disks system.

11. The first node device of claim 10, wherein the node data stored in coordination with data stored in the second node device comprises data corresponding to a parity protected stripe of data that spans the redundant array of independent disks system.

12. The first node device of claim 9, wherein the first node device and the second node device are restricted from being concurrently disabled from providing data based on a sharing of a resource between the first node device and the second node device.

13. The first node device of claim 12, wherein the resource comprises a database journal maintained by the first node device and the second node device.

14. The first node device of claim 9, wherein, during the disabling of the first node device from providing the node data, the access to the node data of the first node device is provided by replacing data of the first node device with error-correction data provided by the neighborhood of node devices.

15. The first node device of claim 14, wherein the update receiving component receives the update for the component of the first node device further based on an analysis of the error-correction data to predict whether the error-correction data can replace the data of the first node device.

16. The first node device of claim 14, wherein the update receiving component receives the update for the component of the first node device further based on a predicted duration for updating the component of the first node device.

17. A non-transitory machine-readable medium comprising executable instructions that, when executed by a processor of a first device, facilitate performance of operations, the operations comprising:
identifying, in a group of dependent nodes of a cluster of nodes, a second device to be updated with an update, wherein the group of dependent nodes stores data linked across the group of dependent nodes;
selecting, from the group of dependent nodes, a third device to provide data of the second device while the second device is updated with the update, wherein the third device was selected based on the third device being determined not to have a dependency on the second device, wherein, when the second device is rendered unavailable for provision of access to the data by the update, the third device is not rendered unavailable for provision of the access to the data; and
updating the second device with the update.

18. The non-transitory machine-readable medium of claim 17, wherein the data is first data, and wherein, during the updating, access to the first data linked across the group of dependent nodes is provided by replacing second data of the second device with third error correction data stored on the third device.

19. The non-transitory machine-readable medium, wherein the identifying the second device is based on a prediction that the second device is able to be updated without affecting access to the data linked across the group of dependent nodes.

20. The non-transitory machine-readable medium of claim 19, wherein the prediction that the second device is able to be updated without the affecting the access to the data linked across the group of dependent nodes was based on an estimated duration for the updating the second device with the update.

* * * * *